Dec. 13, 1960 R. W. TRIPP 2,964,721
ROTARY POSITION MEASURING TRANSFORMER
Filed May 13, 1957 2 Sheets-Sheet 1
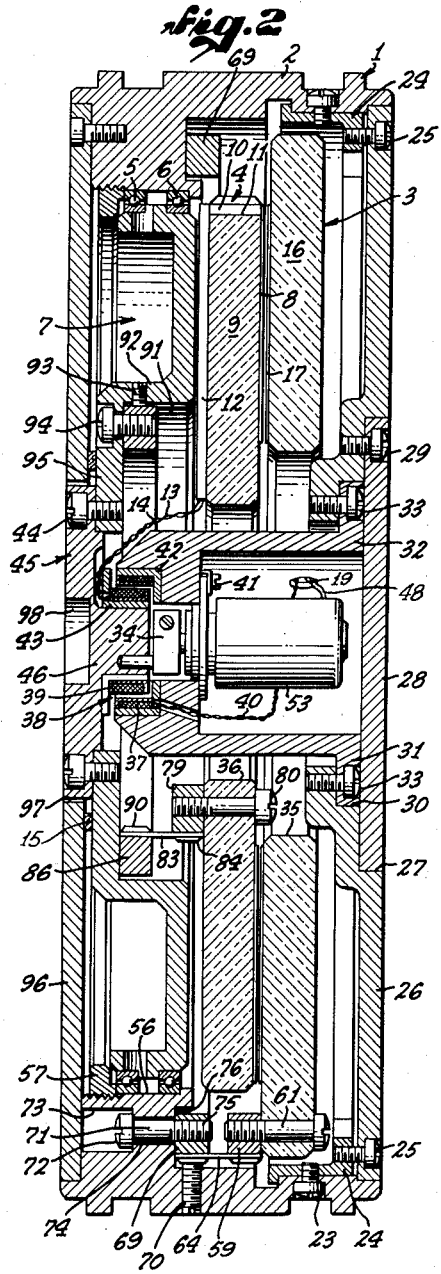
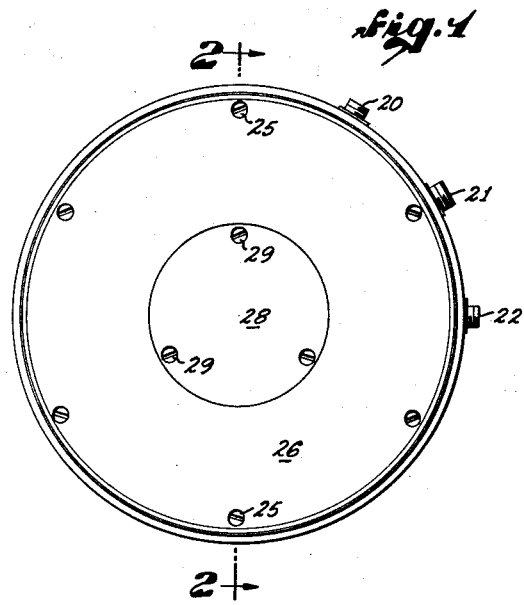
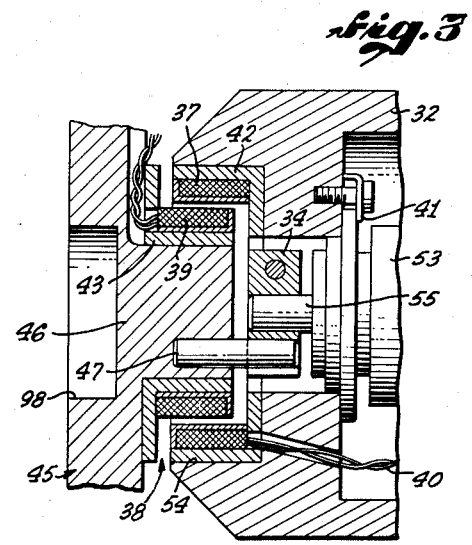
ROBERT W. TRIPP,
INVENTOR.
BY *WEBeatty*
ATTORNEY.

Dec. 13, 1960  R. W. TRIPP  2,964,721
ROTARY POSITION MEASURING TRANSFORMER
Filed May 13, 1957  2 Sheets-Sheet 2
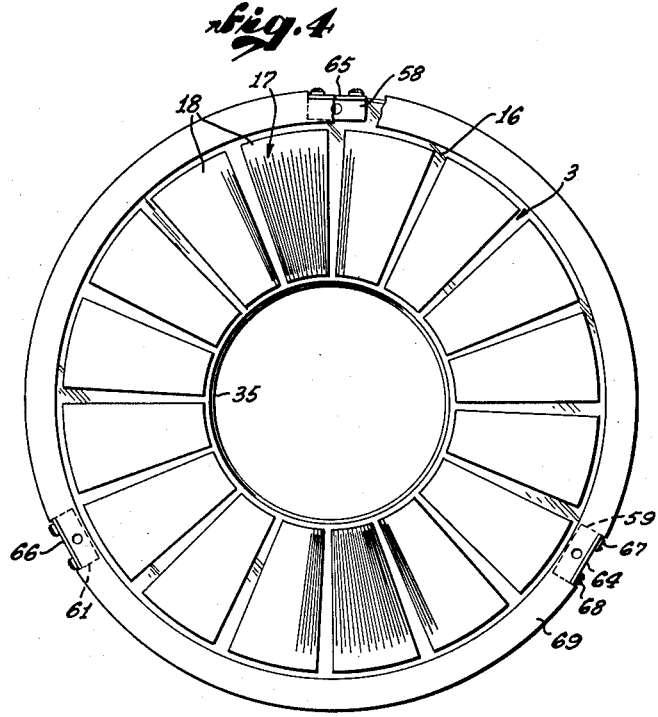
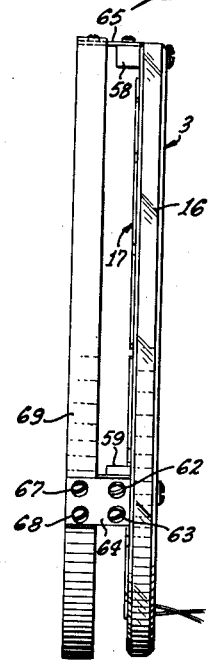
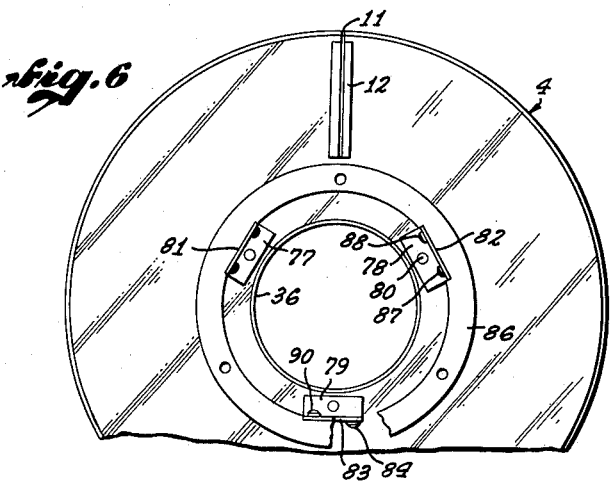
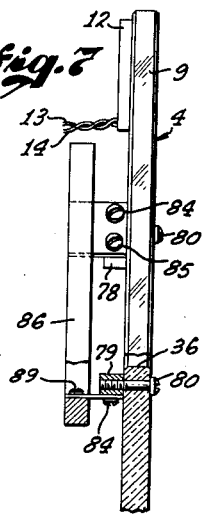
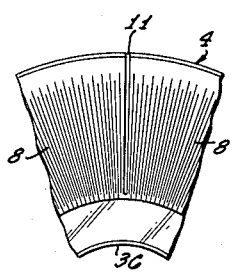
ROBERT W. TRIPP,
INVENTOR.
BY W. E. Beatty
ATTORNEY.

United States Patent Office 2,964,721
Patented Dec. 13, 1960

2,964,721

ROTARY POSITION MEASURING TRANSFORMER

Robert W. Tripp, Bronxville, N.Y., assignor to Inductosyn Corporation, Carson City, Nev., a corporation of Nevada Filed May 13, 1957, Ser. No. 658,623

9 Claims. (Cl. 336—30)

This invention relates to position measuring transformers which are used to establish positions of rotary shafts to an accuracy of a few seconds of arc.

One preferred form of position measuring transformer, known as the Inductosyn, utilizes the magnetic field produced by a series of hairpin-like conductors, arranged in alternate north and south poles. In such a case, the primary consists of two windings on an insulating support and spaced thereon one-quarter cycle with respect to each other, and the secondary is a single winding on an insulating support. The primary and secondary windings have an air core and are mounted for relative rotational movement parallel to each other and in close space relation to each other. This rotary transformer is of the form described in co-pending application, Serial No. 509,168, filed May 18, 1955, by R. W. Tripp and J. L. Winget, now Patent 2,799,835, July 16, 1957, where the conductors have been arranged and proportioned to achieve a uniformity of magnetic coupling between primary and secondary windings, which is truly sinusoidal with respect to displacement. Position measuring transformers of this type have been made wherein a cycle, that is 2 poles, occupies a space of 2° and the coupling corresponds to a sine function within one part in ten thousand. By supplying precise sine and cosine potentials, respectively, to the two primary windings, an accuracy of position has been achieved of 1 milliradian electrical which corresponds to approximately one six-thousandth of a cycle, or one second of arc.

This accuracy of positioning requires that the close space relation of the rotor and stator should not be disturbed by temperature variations. It is an object of the invention to reduce or prevent a variation of the space relation of the stator and rotor due to temperature variations, where the center of the stator and rotor disks are not avialable for attachment to a support.

For further details of the invention reference may be made to the drawings wherein:

Fig. 1 is a plan view of a rotary position measuring transformer according to the invention.

Fig. 2 is an enlarged sectional view on line 2—2 of Fig. 1 looking in the direction of the arrows.

Fig. 3 is an enlarged view of the inductive coupling shown in Fig. 2, with parts broken away.

Fig. 4 is a plan view of the inner side of the stator of Fig. 2.

Fig. 5 is a side view in elevation of the stator of Fig. 4.

Fig. 6 is a plan view of the outer side of the rotor of Fig. 2, with a portion of the rotor broken away, and Fig. 7 is a corresponding side view in elevation partly in section.

Fig. 8 is a plan view of a portion of the inner side of the rotor of Fig. 6 with parts broken away.

Referring in detail to the drawings, the rotary position measuring transformer 1 in Fig. 2 includes a casing 2, usually of metal, and in which is housed the stator 3 and the rotor 4 of the rotary position measuring transformer.

The casing 2 has annular bearings 5 and 6 for a hollow hub 7 on which the rotor 4 is mounted.

The inner face of rotor 4 has a single conductor winding indicated at 8 as shown also in Fig. 8. The rotor winding 8 is arranged on the inner side of a glass plate 9. The ends of the winding 8 are soldered to metal foil strips indicated at 10 and extend through a slot 11 in the plate to the opposite side of the plate where they are protected by a grooved block 12, the leads having the two terminals 13 and 14 as shown in Fig. 7 at the front side of the glass plate 9.

The winding 8 is an electro deposit on the glass disk 9, in this respect like the stator winding 17 described later.

The stator 3 has a similar, stationary glass disk 16 on which is an electro deposit forming the stator winding 17, see also Fig. 4. The stator winding 17 comprises a number of sections like section 18, each section having a plurality of radial conductors connected in series. Each section may consist of groups of four radial conductors each, with alternate groups connected in series to form one of the space quadrature windings, the remaining groups being connected in series to form the other space quadrature winding as disclosed in co-pending application S.N. 636,623, filed by us January 28, 1957, for Rotary Position Measuring Transformer, now Patent 2,844,802, July 22, 1958, said application dealing with flexible shaft couplings for reducing mechanical misalignments for use with rotary position measuring transformers.

In the case of both the stator and the rotor, there is one pole per radial conductor, each such conductor forming a pole, and the pole spacing for example being 1°. The invention is not restricted to any particular number of conductor groups or poles. In the case of the stator of Fig. 4, the conductor sections are connected together to form two windings in space quadrature, the leads for the sections like 18 leading to the outside of the casing 2 at the connectors 20, 21 and 22 in Fig. 1. The rotor winding 8 and the stator winding 17 have an air core.

Secured to one end of casing 2 by means such as screws 23 is a plurality of keys, for example six, one of which is indicated at 24. The keys 24 receive screws like 25 for a plate mounting 26 having a recess 27 to receive a plate cover 28 held in position by screws like 29. The plate mounting 26 has an inset and smaller recess 30 for the flange 31 of a sub-casing 32 held in position by screws like 33. The casing 32 is hollow to provide a chamber for a resolver 53 or other electrical device driven with the rotor 4 and connected thereto by a coupling 34 which clamps the shaft 55 of resolver 53. The sub-casing 32 extends through central openings 35 and 36 in the stator 3 and rotor 4 respectively, the respective flexible supports for the stator and rotor being remote from the axis or center of the stator and rotor, and in the case of the rotor, its support being arranged adjacent the margin of its central opening 36. Due to the presence of the central openings 35 and 36, the center of each disk is not available for attachment to a support. The sub-casing 32 as shown also in Fig. 3 has a recess 54 for a cylindrical winding of transformer member 37 for a coupling transformer 38 and of which the other cylindrical winding of transformer member 39 is carried by the hub 7 and is in circuit with the leads 13 and 14. The coupling transformer member 37 has leads 40. The resolver 53 is held in position by a clamp 41. The shaded portions 42 and 43 represent magnetic material for the transformer members 37 and 39 respectively.

The outer periphery of bearings 5 and 6 fit in a recess 56 in casing 2 and are held in position by a threaded retainer ring 57, while the inner periphery of these bearings is mounted on the periphery of hub 7.

The hub 7 is hollow and is surrounded by the bearings 5 and 6, having secured thereto, by screws like 44, see Fig. 2, a mount 45 which has a central boss 46 which removably receives the pin 47 of the coupling 34 and provides a mount for the magnetic material 43 and the coupling transformer member 39. The signals from the rotor 4 are thus brought out through the coupling transformer 38 without requiring slip rings which have well known disadvantages referred to above.

The flexible mount for and the centering of the rotor and stator will now be described.

As shown in Figs. 2, 4 and 5, secured to the outer or left hand face of the stator 3, as seen in Fig. 2, is a circular array of three blocks 58, 59 and 60, one of which, such as block 59, may be considered as appearing in Fig. 2, each such block being held to the glass disk 16 by a screw like 61. Secured to each such block by screws like 62, 63 is the inner end of a flexure plate 64, or spring, of suitable material such as phosphor bronze. The other two flexure plates are indicated in Fig. 4 at 65 and 66. Each of the flexure plates or springs 64, 65, 66, as appears from Figs. 4 to 7 has a wider side extending transversely to a radial to the axis of the rotor 4. The outer end of each flexure plate like 64 is secured by screws like 67, 68 to a metal ring 69. As shown in Fig. 2, ring 69 is centered by four radially extending centering screws, one of which is shown at 70 in Fig. 2. When ring 69 and the stator 3 are centered, the ring 69 is clamped in an adjusted position by a plurality of screws like 71 which have heads like 72 in a counter-sunk bore like 73, the shank of each screw fitting in an enlarged recess like 74, to allow for centering adjustment of the ring 69. Each screw like 71 has threaded engagement with the ring as shown at 75, to clamp the outer face of the ring against the wall 76 of the casing.

In a similar way, three blocks indicated at 77, 78 and 79 are each secured to the rotor glass disk 9 by a screw like 80, see Fig. 2, these blocks, however, being arranged adjacent the central opening 36 in the glass disk 9, not at the outer periphery as in the case of rotor 4, to permit arranging the rotor and stator in close space relation as shown, the screws like 61 for the stator being arranged outwardly of the periphery of the rotor 4 and the screws like 80 for the rotor being arranged inwardly of the periphery of the central hole 35 in the stator. For the rotor 4 there are provided three flexure plates indicated at 81, 82 and 83, similar to the stator flexure plates 64 to 66, each such rotor flexure plate being secured to the inner end of the corresponding block 77 to 79 by a pair of screws like 84 and 85 in Fig. 7 while the outer ends of each rotor flexure plate extends inside of a ring 86. Each flexure plate 81 to 83 is secured to ring 86 by a pair of screws like 87 and 88, one of this pair such as 89 appearing in Fig. 7, the other one of the pair not appearing in this figure as it is behind 89, being shown at 90 in Fig. 6.

The rotor ring 86 is arranged within the space embraced by the bearings 5 and 6, being housed in a re-entrant recess 91 of the hub 7. This re-entrant portion also provides a cylindrical wall portion 92 which is coaxial with the axis of the casing 2 and having four centering screws, one of which is shown at 93 in Fig. 2. The rotor 4, when centered, is clamped in adjusted position by a plurality of screws like 94 arranged in the radial wall portion 95 of the hub 7.

The outer end of the casing 2 has a plate cover 96 which has a central opening 97 to expose the outer end of the mount 45.

The flexible support for the rotor and stator, provided by the flexure plates 64 to 66 also 81 to 83 as described above, allows for differential expansion of the glass 9 or 16 in a radial direction without shift in the location of the center of the glass with respect to casing 2. The flexure springs 81 to 83 for the rotor 4 and springs 64 to 66 for the stator 3 can bend in a direction radially of the axis of rotation but are very stiff in tangential directions. Each set of these three springs will then restrain their respective glass plates 9 or 16 from moving except in a radial direction.

Parallelism of the rotor and stator plates 9 and 16 is accomplished by properly manufacturing the equipment so that the mounting rings 69 and 86 are accurately parallel to their respective glass surfaces.

The output shaft of this device is the mount 45 which has a central locating surface or socket 98, and tapped holes not shown around its periphery. If desired, this mount 45 may be a bellows coupling as described in Patent 2,844,802 referred to above to provide for misalignments between the casing 2 and the shaft not shown to which it is to be coupled.

Referring to Fig. 2, the leads 40 for the coupling transformer 38 and the leads 48 for the resolver 53 extend through an opening 19 in the wall of sub-casing 32. Also, a dust seal indicated at 15 is provided between the plate cover 96 and the adjoining wall portion 95 of the rotor hub 7.

Various modifications may be made in the invention without departing from the spirit of the following claims. For example, the mounting may consist of glass plates together with their flexure plate supports and ring mounts essentially the same as shown in the drawings except that no casing or bearings or other support structure will be supplied. These glass plates will then be mounted directly to the equipment to be controlled or measured. In this case, adjustment screws will be provided in the equipment to be controlled. This method of mounting has the advantage that it eliminates the need for either extra bearings or a flexible coupling to compensate for the misalignment of the separate shafts. Experience has shown that it is always more accurate to mount the plates 9 and 16 directly in the equipment. While these plates are preferably of glass, other insulating material may be used.

I claim:

1. A rotary transformer comprising a casing having therein closely spaced stator and rotor disks of insulating material, said disks being substantially coaxial with respect to the rotary axis of said rotor, a transformer winding on each of the adjacent faces of said disks, a flexible support between said stator disk and said casing remote from the center of said stator disk, a rotatable hub having a bearing support in said casing, and another flexible support between said hub and said rotor disk remote from the center of said rotor disk, each of said flexible supports comprising a plurality of circumferentially spaced flexure springs extending longitudinally of said axis and having flexibility in directions radially of said axis and having substantial stiffness in tangential directions, each of said springs having a wider side extending transversely to a radial to said axis.

2. A rotary transformer according to claim 1, said flexible support for said stator disk comprising a circular array of blocks, means of securing said blocks to said stator disk, a ring, means for securing said ring to said casing, radial adjusting screws for centering said ring, said flexure springs for said stator disk being secured at their opposite ends in said ring and in said blocks respectively.

3. A rotary transformer according to claim 1, said hub being hollow, a ring, radial screws carried by said hub for centering said ring, means carried by said hub for securing said ring in adjusted position, a circular array of blocks carried by said rotor, said flexure springs for said rotor being secured at one end in said ring and at their other ends to said blocks respectively.

4. A rotary transformer according to claim 3, said ring being positioned on said hub within the space encompassed by said bearing support.

5. A rotary transformer according to claim 1, said transformer having an air core, one of said windings being a single continuous winding and the other winding comprising windings in space quadrature of the pole cycle of said single winding, said flexible support for said stator disk being arranged between said casing and the periphery of said stator disk, said rotor having a central aperture adjacent the margin of which its said flexible support is arranged.

6. A rotary transformer comprising a disk of insulating material, a transformer winding on the face of said disk, a flexible support for said disk, said flexible support comprising a plurality of circumferentially spaced flexure springs extending longitudinally of the axis of said disk and having flexibility in directions radially of said disk and having substantial stiffness in tangential drections, a circular array of blocks, means for securing said blocks to said disk, a ring, and separate means for securing one end of each of said flexure springs to said ring and for securing their opposite ends to said blocks respectively.

7. A rotary transformer comprising a disk of insulating material, a transformer winding on the face of said disk, a flexible support for said disk, said flexible support comprising a mounting ring coaxial with said disk, and axially extending flexure springs interconnecting said ring and said disk, each of said springs having flexibility in a radial direction and having a wider side extending transversely to a radial to the axis of said disk.

8. A rotary transformer according to claim 7, said disk having an unsupported central portion, said flexible support constituting the sole support for said disk.

9. A rotary transformer comprising a casing having therein closely spaced stator and rotor disks of insulating material, said disks being substantially coaxial with respect to the rotary axis of said rotor, a transformer winding on each of the adjacent faces of said disks, the central portion of each of said disks having a through aperture and being not available for attachment to a support, and means comprising a separate flexible support for each of said disks, each of said flexible supports being located at a substantial distance from the center of its disk, each of said flexible supports comprising flexure springs extending longitudinally of said axis, each of said springs having a wider side extending transversely to a radial of said axis, the springs of each of said flexible supports providing substantial stiffness in directions longitudinally of said axis and flexibility in radial directions.

References Cited in the file of this patent

UNITED STATES PATENTS

| | | |
|---|---|---|
| 2,432,982 | Braddon | Dec. 23, 1947 |
| 2,627,062 | Graham | Jan. 27, 1953 |
| 2,637,839 | Piety | May 5, 1953 |
| 2,671,892 | Childs | Mar. 9, 1954 |
| 2,683,596 | Morrow | July 13, 1954 |
| 2,712,115 | Tubbs | June 28, 1955 |